United States Patent [19]

Heissat et al.

[11] Patent Number: 5,490,601

[45] Date of Patent: Feb. 13, 1996

[54] DEVICE FOR CONTROLLING THE TRANSFER OF A LOAD SUSPENDED BY CABLES FROM A CARRIAGE MOVABLE IN TRANSLATION IN A LIFTING MACHINE

[75] Inventors: Jean-Marc Heissat, Auxerre; Jean-Marc Lacour, Osny, both of France

[73] Assignee: Telemecanique, Rueil Malmaison, France

[21] Appl. No.: 155,772

[22] Filed: Nov. 23, 1993

[30] Foreign Application Priority Data

Nov. 23, 1992 [FR] France .................... 92 14149

[51] Int. Cl.$^6$ .................................................. B66C 19/00
[52] U.S. Cl. .................................................. 212/275
[58] Field of Search .................... 212/147, 132, 212/153, 275, 328, 329

[56] References Cited

U.S. PATENT DOCUMENTS 4,717,029  1/1988  Yasunobu et al. .......... 212/147
5,117,992  6/1992  Simkus, Jr. et al. .
5,127,533  7/1992  Virkkunen ................ 212/147
5,219,420  6/1993  Kiiski et al. ............ 212/147

FOREIGN PATENT DOCUMENTS 0394147  10/1990  European Pat. Off. .
0467783  1/1992   European Pat. Off. .
2637696  2/1978   Germany .

*Primary Examiner*—Michael S. Huppert
*Assistant Examiner*—Thomas J. Brahan
*Attorney, Agent, or Firm*—Oblon, Spivak, McClelland, Maier & Neustadt

[57] ABSTRACT

In a device for regulating the transfer of a load suspended by cables from the carriage of a lifting machine the carriage speed is controlled by means of a position corrector and an angle corrector weighted outputs of which are summed to establish the speed set point. The lifting machine operator has an operating mode selector connected to a control unit which enables the correctors as appropriate to the selected control mode.

6 Claims, 3 Drawing Sheets

| | POSITION CORRECTOR 32 | ANGLE CORRECTOR 33 | CARRIAGE CONTROL SWITCH 21 | TARGET DIALOG 25 |
|---|---|---|---|---|
| MM | 0 | 0 | 1 | 0 |
| MMA | 0 | 1 | 1 | 0 |
| MA | 1 | 1 | 0 | 1 |
| CB | 1 | 1 | 0 | 0 |

DEVICE FOR CONTROLLING THE TRANSFER OF A LOAD SUSPENDED BY CABLES FROM A CARRIAGE MOVABLE IN TRANSLATION IN A LIFTING MACHINE

BACKGROUND OF THE INVENTION

1. Field of the Invention

The present invention concerns a device for regulating the transfer of a load suspended by cables from a carriage movable in translation in a lifting machine.

2. Description of the Prior Art

Lifting machines such as travelling overhead cranes and gantry cranes comprise a carriage movable in translation by at least one horizontal travel motor connected to a variable speed drive and at least one lifting motor associated with cables and with a load suspension device to lift or lower the load. The load is displaced from an initial position to a final or target position by the combination of horizontal and vertical movements.

Due in particular to the accelerations imparted to it, the suspended load acquires in the direction of horizontal displacement a weakly damped pendular motion, called sway hereinafter, which must be controlled to transfer the load gently and safely. In the specific case where the machine is a container gantry crane, the precision with which the container must be put down is on the order of 5 cm and this requires the swaying movement to be eliminated.

The patent FR-2 571 867 describes damping the oscillation of a suspended load by dynamic control of the acceleration of the carriage which entails adding to a signal controlling the carriage travel motors a corrector signal determined from the angular speed of the pendulum. The system described is not able to control the position of the carriage or to offer the operator a choice of modes of operation.

The patent WO-91 14 644 describes a method of transferring a suspended load in which oscillation of the load is reduced by predictive control using a mathematical model while positioning the load. The drawback of a method of this kind is that it does not have the required performance in all cases, in particular for displacements at low speed or over short distances. Also, predictive processing requires that the path of the load be determined and so rules out dissociation of load lifting processing and carriage displacement processing. The only control mode that can be used is an automatic cycle.

SUMMARY OF THE INVENTION

An object of the invention is to displace a suspended load towards a target with great accuracy and with load sway under control, without requiring any predictive mathematical model, and by means of a horizontal travel speed control device combining a position corrector and an angle corrector.

Another object of the invention is to offer the lifting machine operator a choice of several modes of operation: fully automatic operation, assisted manual operation and/or sway cancellation control ("sway-breaking") using all or part of the speed control device.

The invention includes a device for controlling the transfer of a load suspended by cables from a carriage movable in translation in a lifting machine such as a travelling overhead crane or gantry crane comprising:

—control and dialogue means at the disposal of the machine operator,

—at least one horizontal travel motor associated with said carriage, means for sensing the suspension height, the sway angle and the angular speed of the load and the linear position of the carriage to provide respective signals, —a speed control system which, according to signals received from said sensing means, procures movement of the carriage minimizing load sway, said speed control system comprising:

—a carriage position corrector for receiving the measured position signals X and a target position value $X_B$ and for delivering an offset relative to target position $\Delta X$ weighted by a gain $k_1$, —a sway angle corrector for receiving the measured sway angle signal $\theta$ and a respective angular speed signal $\theta'$ and for assigning respective gains $k_2$, $k_3$ to these signals, —a computing unit for determining by real time interpolation the values of the gains $k_1$, $k_2$, $k_3$ according to the suspension height signal L, and —a summing unit which sums the weighted values received from said two correctors and delivers a speed set point signal $VC = k_1 \Delta X + k_2 \theta + k_3 \theta'$ to a variable speed drive associated with a carriage displacement motor.

The device thus controls the dynamic behavior of the load as it is transferred and positions the load over the target by finally nulling the following parameters: carriage displacement speed, carriage position error, sway angle, sway angular speed, irrespective of the initial disturbances (initial sway) or disturbances arising during transfer (wind effects, variations in the height of the load).

One consequence of the specific control process used is that the load can be placed on a target with an accuracy of ±5 cm employing maximum torque and motor speed if the length of the pendulum does not exceed 40 meters.

The control and dialog means preferably comprise:

—a control switch for manual control of displacement of said carriage,

—a control switch for manual control of raising of the load,

—an operating mode selector for selecting automatic and manual assisted operating modes, and said control and dialog means are preferably connected to a control unit which selectively enables or disables the position sensor according to the operating mode selected.

A dialogue unit enables the operator to determine or enable the target position value required under automatic control. A sway suppressor unit commands a control cycle in which the cycle start position value is fed into the position corrector as the target position value.

One embodiment of the invention is described hereinafter by way of non-limiting example.

DETAILED DESCRIPTION OF THE INVENTION

Figures 1, 6:
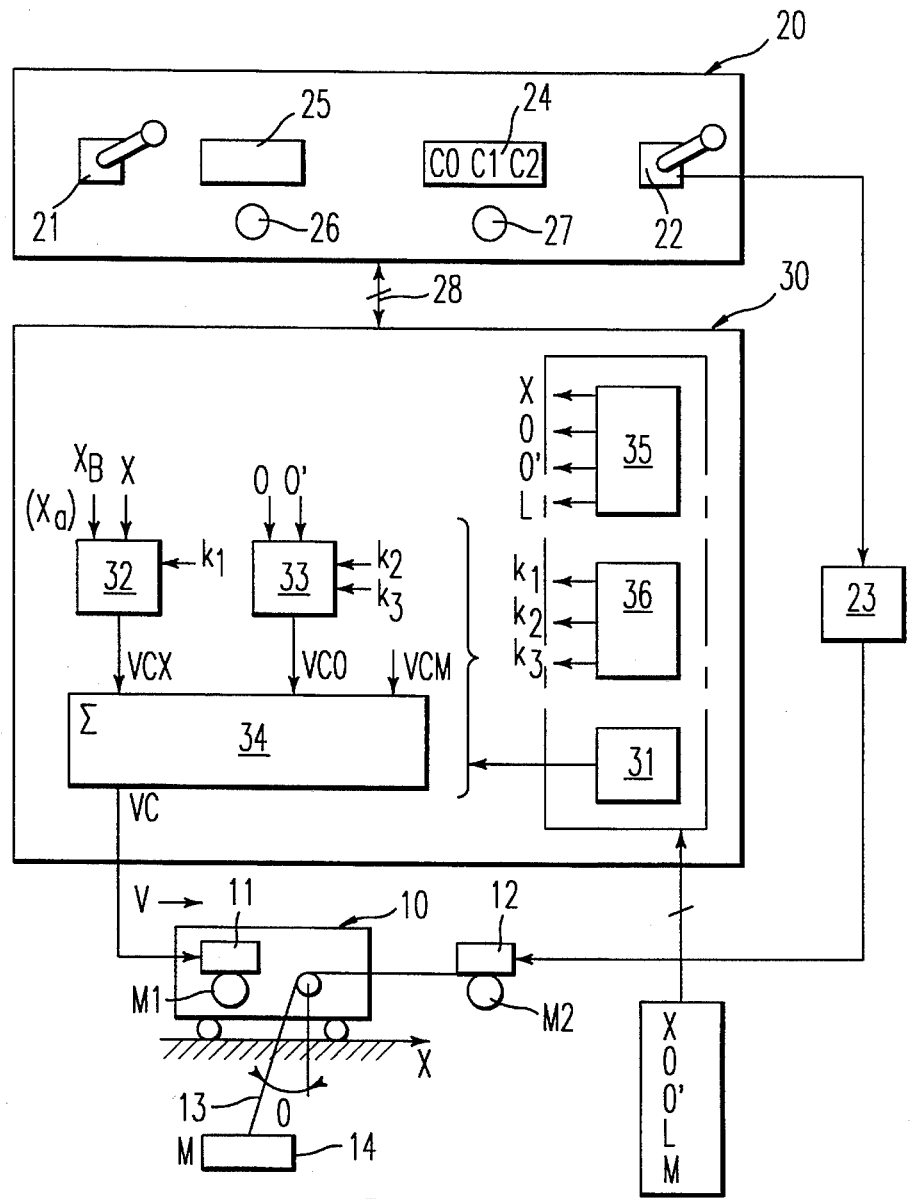
FIG. 1 is a diagrammatic representation of a device in accordance with the invention.
FIG. 6 shows the active or inactive state of the units of the device in the various operating modes mentioned above.

The transfer control device of FIG. 1 is associated with a lifting machine such as a travelling overhead crane, gantry crane or the like having a carriage 10 movable in translation along a direction X at a variable speed V by means of at least one motor $M_1$ connected to a variable speed drive 11. The carriage is further associated with at least one motor $M_2$ connected to a variable speed drive 12 to vary the length L of the cables 13 from which is suspended a load 14 of mass M (a container, for example). Due to disturbing effects including accelerations, the load is susceptible to begin a pendular or swaying movement in the direction X defined by an angle θ and an angular speed v'. The object of the device is to transfer the load from an initial position A to a final position B with all sway eliminated on approaching the final position.

To this end the device comprises a closed loop control system to be described later conditioning the speed of movement of the carriage. Sensors (not shown) are associated with the carriage and the load to supply to the control system signals respectively representative of the position X of the carriage, the sway angle θ, the angular speed θ' of the oscillatory movement and the length L of the suspension cable 13. A sensor responsive to the mass M of the load may be added to detect the presence of the load and in some cases to be incorporated into the control closed loop. The sensors are of conventional types, the angle sensor preferably being an optical sensor. The angular speed signal is either supplied by the angle sensor or computed by the control system from the angle signal.

The machine operator is provided with various control and dialog means 20: a carriage displacement control switch 21 operated to supply a set point speed $V_{cm}$ to the speed control system 30, a lifting control switch 22 for manual control via a lifting processor device 23 separate from the system 30 of the variable speed drive 12 associated with the lifting motor $M_2$, a selector 24 set to a state CO for manual operation, a state C1 for automatic operation and a state C2 for manual assisted operation. For automatic operation a dialog unit 25 enables the operator to set and display and/or to enable the value $X_B$ of the required or detected target position when a pushbutton 26 is pressed to start an automatic transfer cycle.

A pushbutton 27 starts an automatic sway-breaking cycle which can be carried out with the carriage in motion or at rest. The control means 21 and 24–27 may be electromechanical, electronic and/or software, as appropriate, and are connected to the system 30 by linking means 28.

The control system 30 comprises a control unit 31, a position corrector 32, a sway angle corrector 33 and a summing unit 34. An interface unit 35 supplies position X, sway angle θ, angular speed θ' and suspension length L signals derived from signals provided by the respective sensors. The position corrector 32 receives the position signal X and the target position value $X_B$ when the latter is supplied or enabled by the dialog unit 25 or the initial position signal $X_0$ when a sway-breaking cycle starts; the position corrector assigns a weight or gain $k_1$ to the difference $X-X_B$ or $X-X_0$. The angle corrector 33 receives the angle signal θ and angular speed signal θ' and assigns them respective weight or gains $k_2$ and $k_3$. The gains $k_1$, $k_2$ and $k_3$ are determined by real time interpolation by a computing unit 36 and depend on the length L of the cable 13 and on the dynamic characteristics of the motor/variable speed drive combination 11, $M_1$ as well as (where applicable, and discontinuously) the amplitude of the sway. The correctors are connected to the summing unit 34 to supply it with the peak limited values $k_1 \Delta X$, $k_2 \theta$ and $k_3 \theta'$. The summing unit sums these to produce a variable set point speed signal VC which +is passed to the variable speed drive 11. Gain scheduling in real time is achieved by any appropriate interpolation mode, for example a fuzzy control or neural network mode or a mode involving learning. It is advantageously implemented on an industrial programmable controller circuit board.

The control unit 31 manages the operation of the control system 30 and on the basis of signals S1 through S4 supplied by the control means 20 and received via the link 28 outputs enabling signals SVX and SVθ for each of the correctors 32, 33. It is obvious that complementary disabling signals could be used instead of these enabling signals. The control system uses electronic or software means implemented in at least one programmable controller electronic module.

Figure 2:
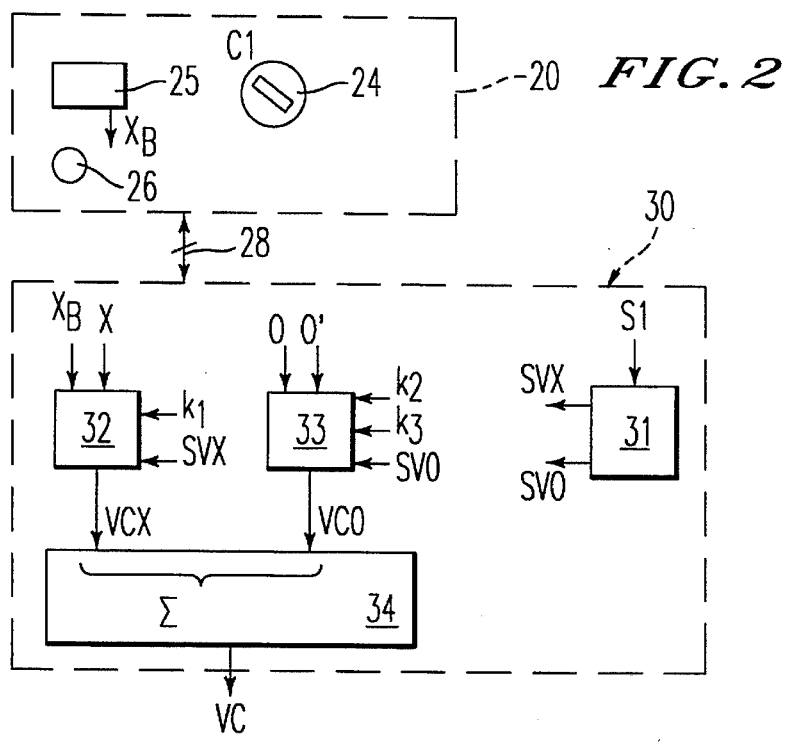
FIGS. 2 through 5 show the major components of the device respectively active in the automatic operation, manual assisted operation, manual operation and sway-breaking control modes.

FIG. 2 shows the operation of the device in automatic mode. The operator sets the selector 24 to the state C1 and adjusts or enables the target determination unit 25 to the required value $X_B$. The control unit 31 receives a signal S1 immediately when the operator presses the automatic cycle start button 26 and enables the two correctors 32, 33 by means of respective instructions or signals SVX and SVθ. The summing unit sums the weighted values VCX and VCθ from the two correctors and outputs the variable set point value VC.

Figure 3:
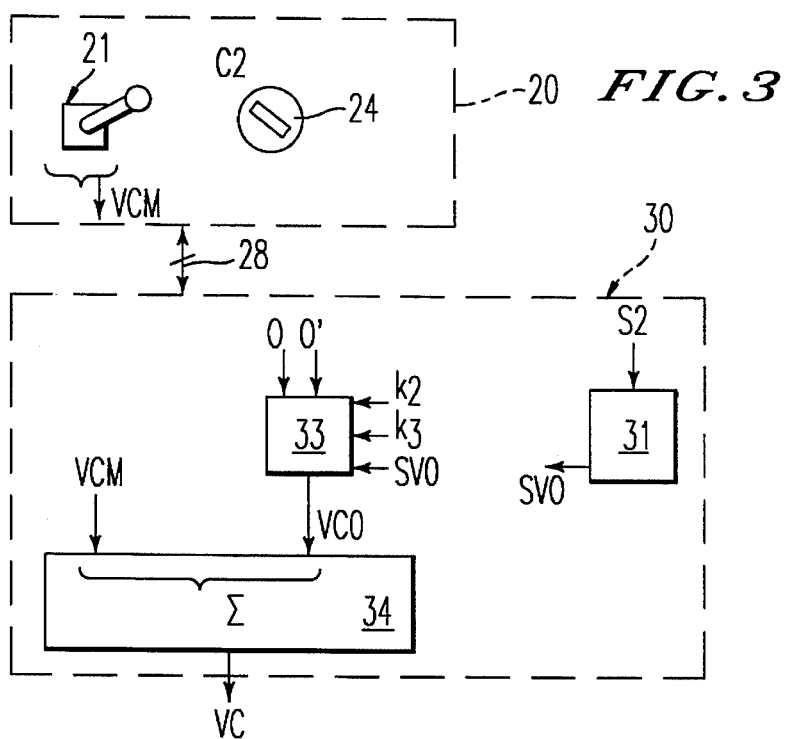

FIG. 3 shows the manual assisted operating mode. The operator sets the selector 24 to the C2 state and then operates the control switch 21 which outputs a speed set point which varies with the action applied to the control switch and is introduced in the form of the signal VCM into the summing unit. This sums VCM with the set point VCθ from the angle corrector 33 and generates VC. The control unit receives a signal S2 from the control means 20 and sends an enabling signal SVθ to the corrector 33. However, it does not send any enabling signal (or disabling signal) to the position corrector 32, which therefore remains inactive.

Figure 4:
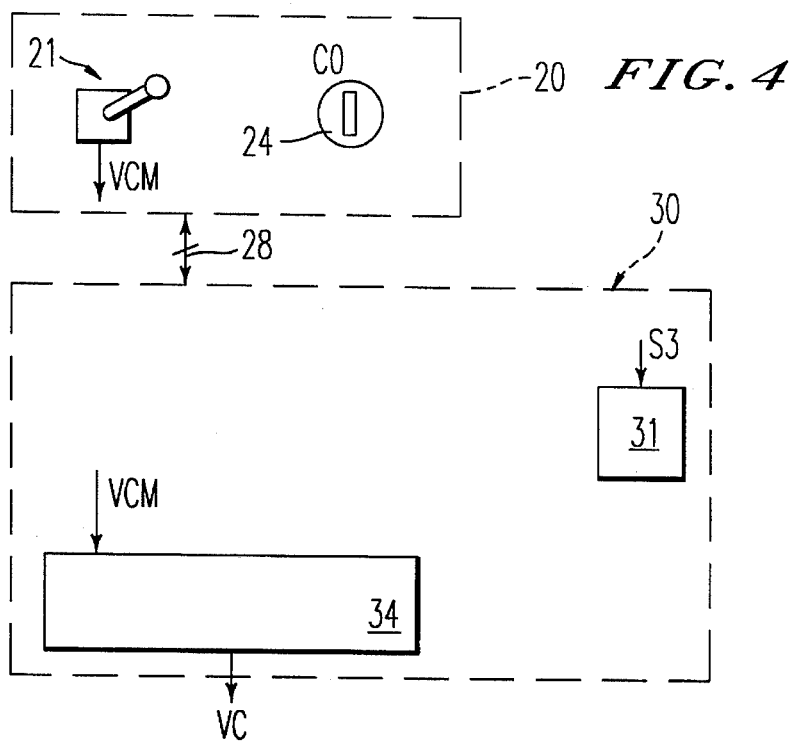

FIG. 4 shows purely manual control. The selector is set to the CO position. The control unit receives a signal S3 and does not enable (or disable) the two correctors 32, 33. The speed is then controlled entirely by the set point VCM produced by operating the control switch 21.

Figure 5:
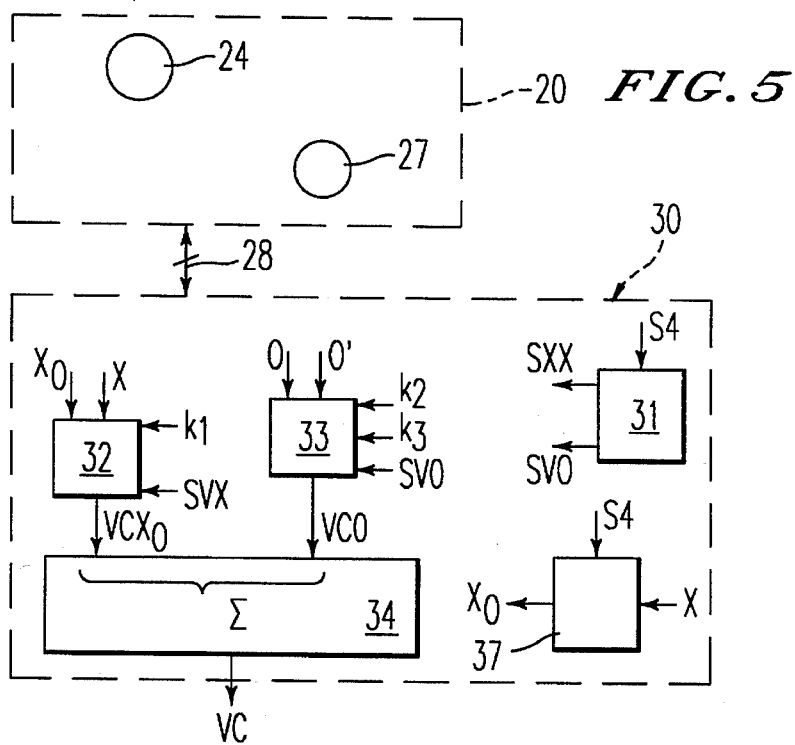

FIG. 5 shows the "sway breaking" control mode. During load transfer or with the load stationary the operator presses the specific pushbutton 27 to initiate a quasi-static control cycle. The signal S4 generated by the control means 20 causes the start of cycle value $X_0$ of the position value X to be stored a unit 37. This value is fed to the corrector 32. The signal S4 causes the control unit 31 to enable the two correctors 32, 33. After the sway is eliminated, the carriage is returned to its position $X_0$. Sway breaking control is possible only if the control switch 21 is idle and is used either with the load at rest or by interrupting an automatic control cycle.

During an automatic cycle the operator can resume manual control by means of the control switch 21 due to an override facility. The control unit 31 interrupts the corrector enabling signals SVX, SVθ as soon as the control switch 21 is operated. To resume the interrupted cycle the automatic cycle start maneuver must be repeated.

Note that in the embodiment described lifting processing, even when programmed, is effected independently of carriage position processing. The position and angle correction signals VCM and VCθ are advantageously peak-limited before they are fed to the summing unit in order to keep them within acceptable limits.

FIG. 6 is a table showing the active (1) or inactive (0) state of the position corrector 32, the angle corrector 33, the carriage displacement control switch 21 and the dialog unit 25 in the following respective operating modes of the transfer device: fully automatic mode MM, assisted manual mode MMA, automatic mode MA, sway breaking mode CB. The control unit 31 activates and deactivates the aforementioned units. Note that automatic operation is enabled if the selector is set to automatic, the carriage displacement control switch is idle, the sway breaking controller is idle and a target has been defined and/or confirmed by the operator.

The device as described is applicable when the lifting machine has two orthogonal axes of horizontal displacement to eliminate orthogonal sway movements of similar period and separate amplitude.

There is claimed:

1. A device for controlling the transfer of a load suspended by one or more cables from a carriage movable in translation in a lifting machine such as a travelling overhead crane or gantry crane comprising:

control and dialogue means at the disposal of a machine operator;

at least one horizontal travel motor associated with said carriage;

means for sensing the suspension height, the sway angle and the angular speed of the load and the linear position of the carriage to provide respective signals L, $\theta$, $\theta'$, X; and a speed control system which, according to signals received from said sensing means, procures movement of the carriage minimizing load sway, said speed control system comprising:

a carriage position corrector for receiving the measured position signals X and a target position value $X_B$ and for delivering an offset value relative to target position $\Delta X$ weighted by a gain $k_1$, a sway angle corrector for receiving the measured sway angle signal $\theta$ and a respective angular speed signal $\theta'$ and for assigning respective weighting values $k_2$, $k_3$ to said sway angle signal and said angular speed signal, a computing unit for determining by real time interpolation the values of the gains $k_1$, $k_2$, $k_3$ according to the suspension height signal L, and a summing unit for summing the offset value, the weighted sway angle signal, and the weighted angular speed signal, for delivering a speed set point signal $VC=k_1\Delta X+k_2\theta+k_3\theta'$ to a variable speed drive associated with a carriage displacement motor.

2. The device according to claim 1 wherein said control and dialog means comprise:

a control switch for manual control of displacement of said carriage;

a control switch for manual control of raising of the load; and an operating mode selector for selecting automatic and manual assisted operating modes, wherein said control and dialog means are connected to a control unit which selectively enables or disables the position sensor according to the operating mode selected.

3. The device according to claim 2 wherein said operating mode selector has a manual operation setting in which said control unit disables said position and angle correctors.

4. The device according to claim 1 wherein said control and dialog means comprise a dedicated sway eliminator unit for commanding a control cycle in which the cycle start position $X_0$ is fed into said position corrector as a target position value.

5. The device according to claim 1 wherein said control and dialog means comprise a target determination unit supplying the target position signal $X_B$ to said position corrector.

6. The device according to claim 1 wherein said computing unit for computing said gains by real time interpolation is integrated into an industrial programmable controller circuit board.

* * * * *